Oct. 17, 1967     L. W. ERATH     3,348,145
APPARATUS FOR TESTING AND MEASURING A.C. PARAMETERS
OF ACTIVE ELEMENTS CONNECTED IN CIRCUIT
Filed Oct. 18, 1963     7 Sheets-Sheet 1

INVENTOR
Louis W. Erath

BY *Arnold, Roylance & Harris*
ATTORNEYS

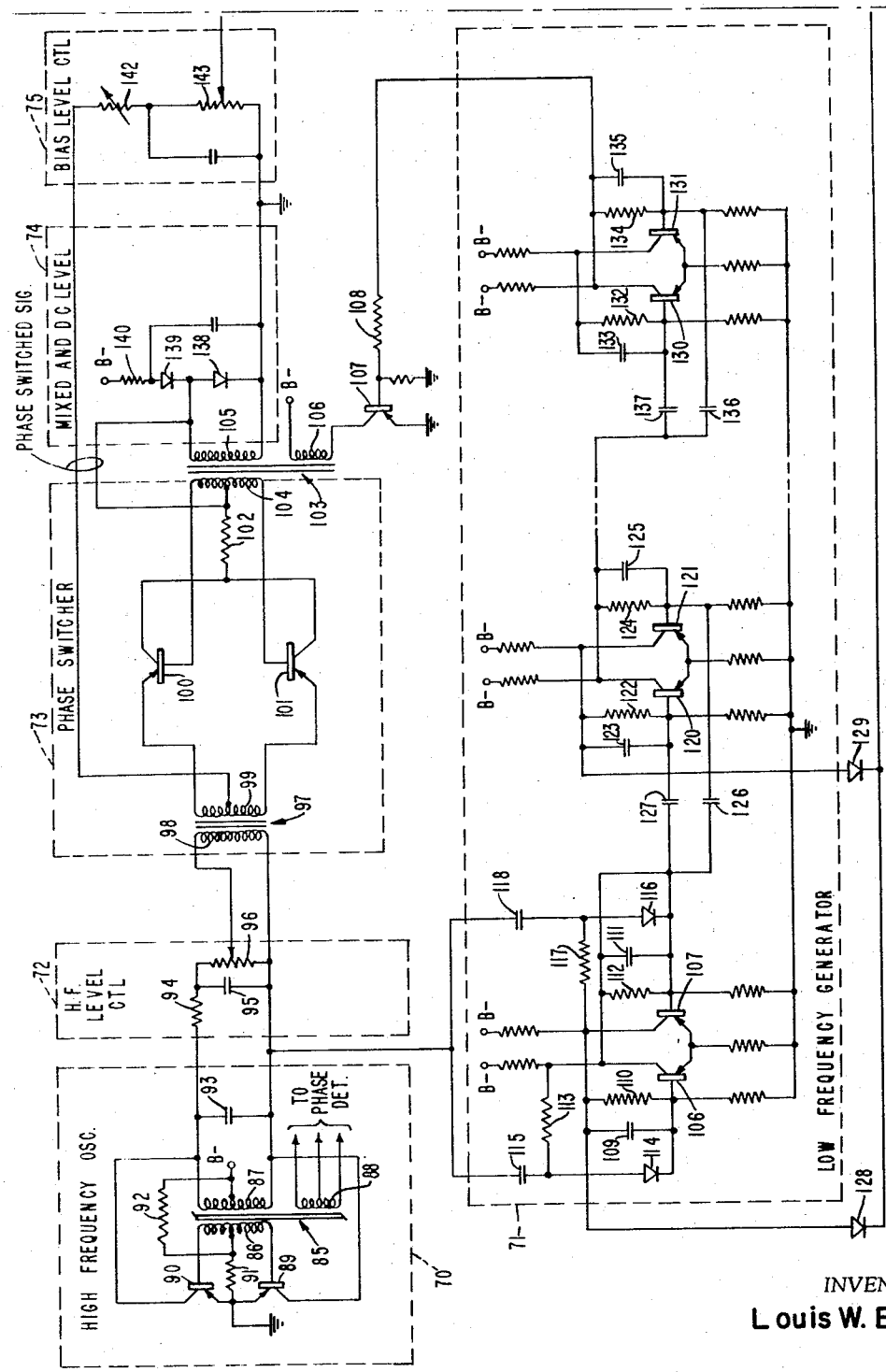

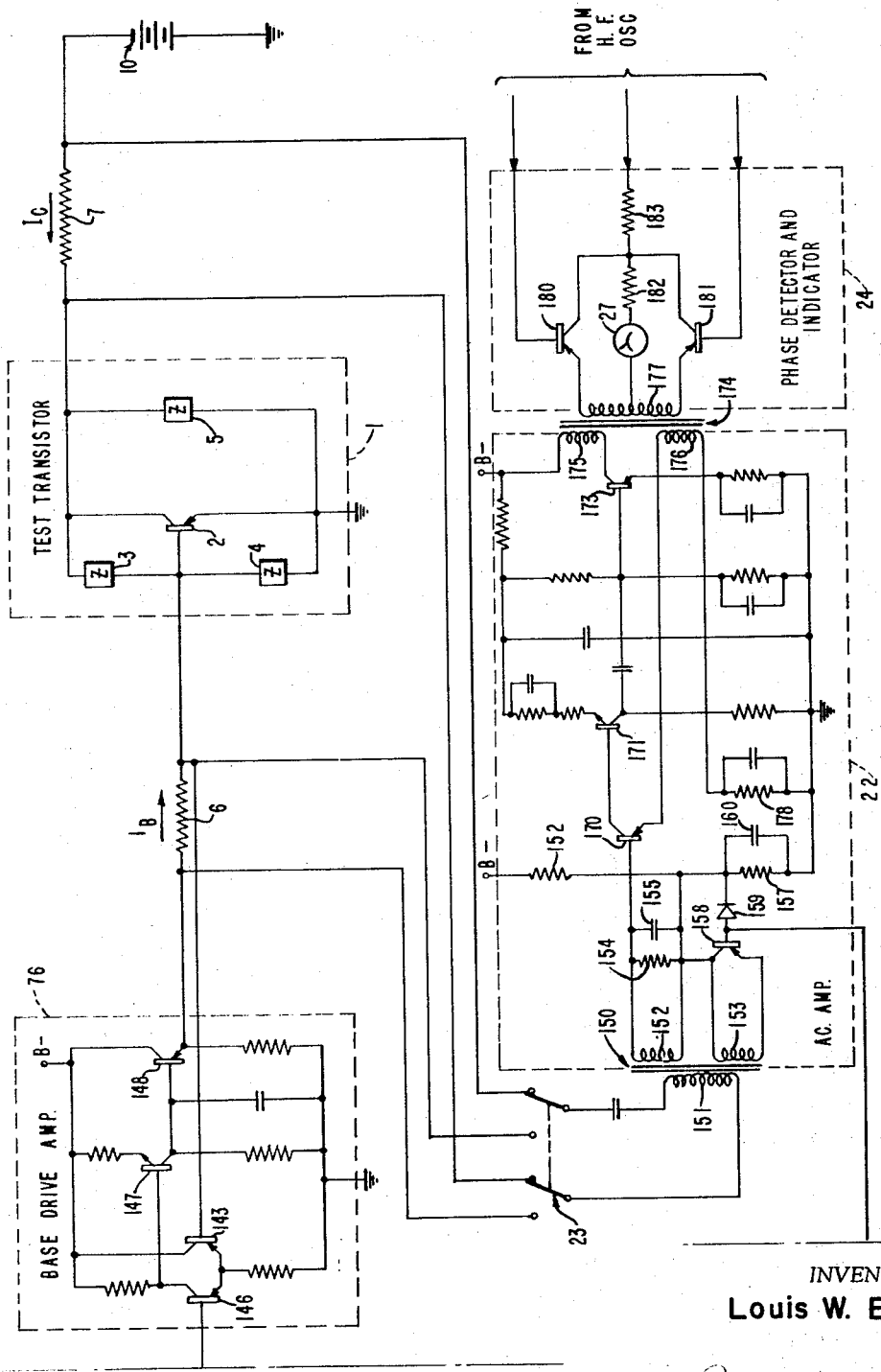

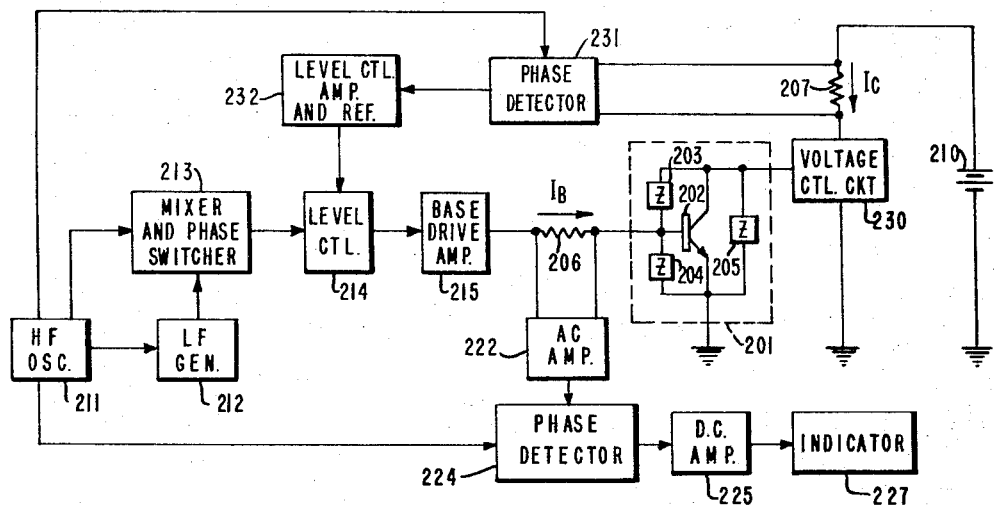
FIG. 7.
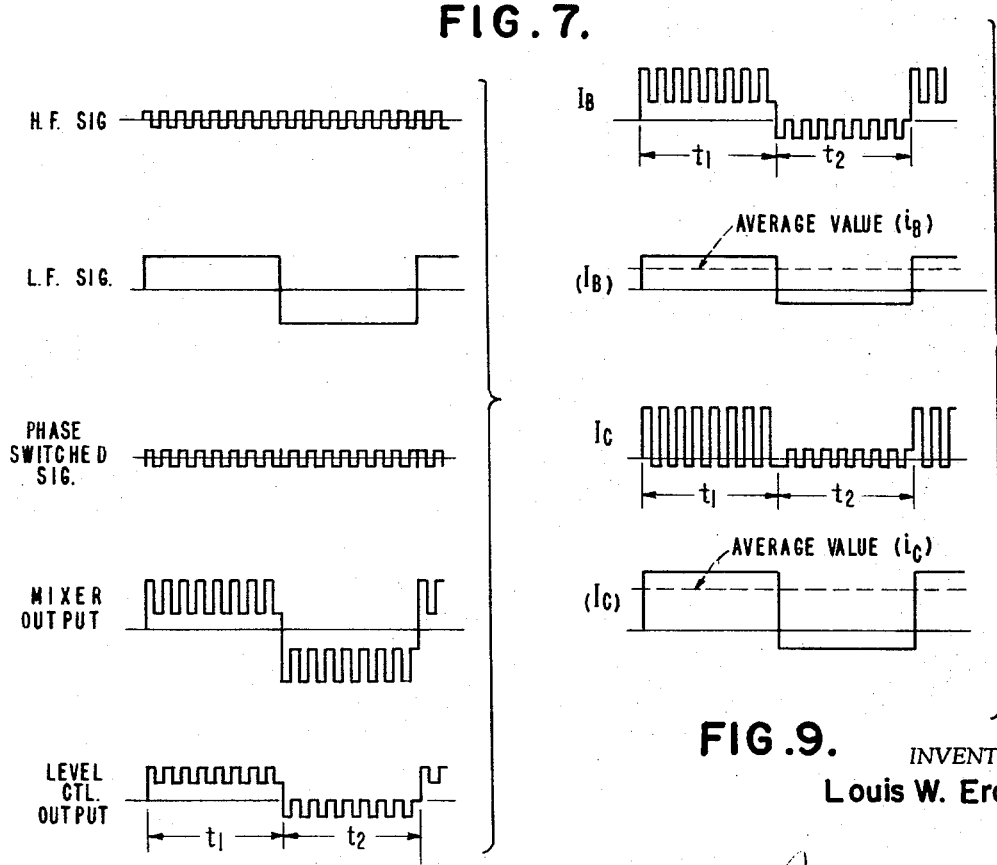
FIG. 8.
FIG. 9.
INVENTOR
Louis W. Erath
BY Arnold, Roylance + Harris
ATTORNEYS

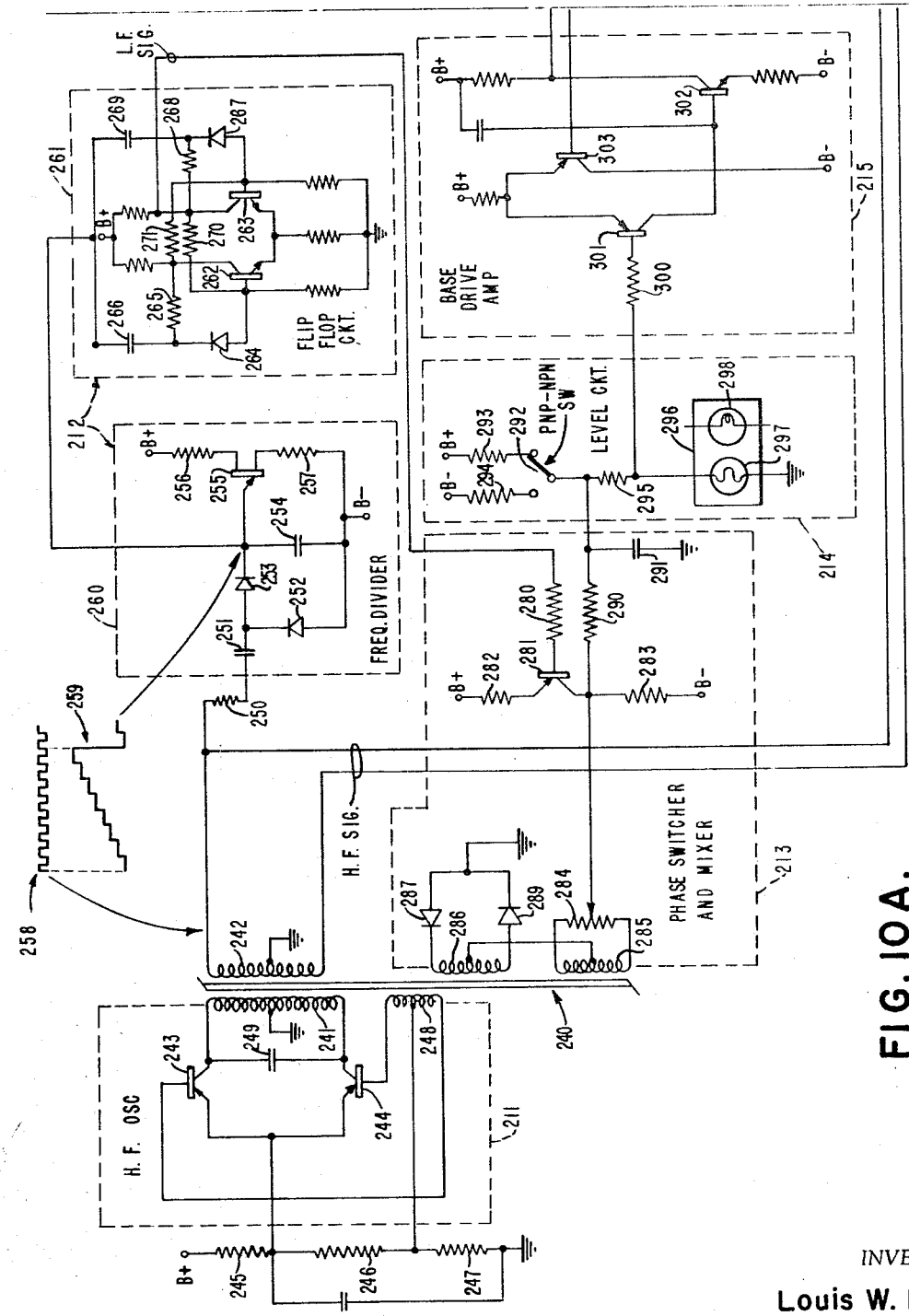

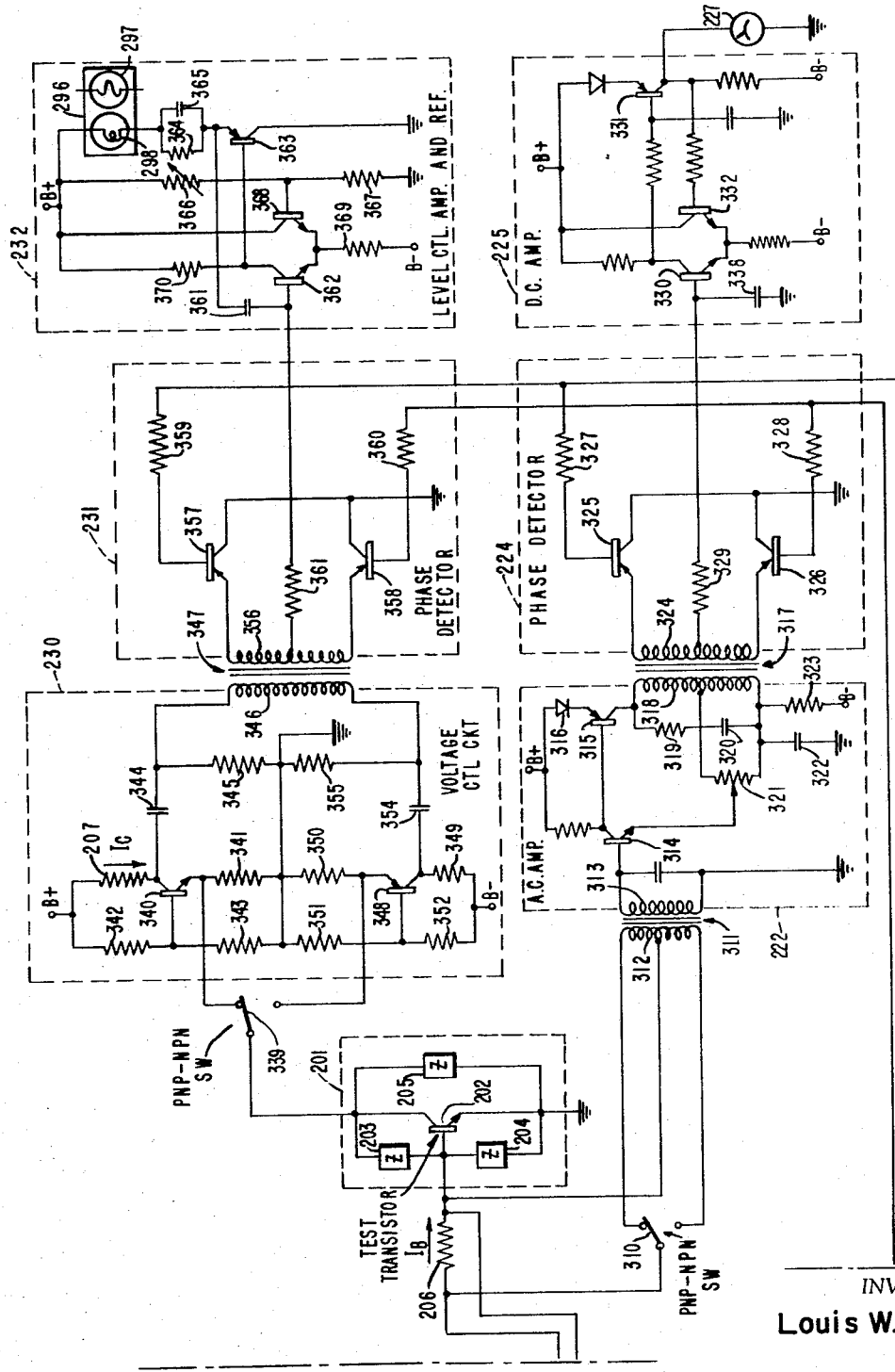

United States Patent Office 3,348,145
Patented Oct. 17, 1967

3,348,145
APPARATUS FOR TESTING AND MEASURING A.C. PARAMETERS OF ACTIVE ELEMENTS CONNECTED IN CIRCUIT
Louis W. Erath, Houston, Tex., assignor to Test Equipment Corporation, Houston, Tex., a corporation of Texas
Filed Oct. 18, 1963, Ser. No. 317,246
12 Claims. (Cl. 324—158)

ABSTRACT OF THE DISCLOSURE

A measuring method and system for determining the alternating current parameters of active elements while connected with other impedance elements which utilize an A.C. signal applied to the active element at selected bias levels and then measure the output A.C. currents, the difference in the amplitudes of the output A.C. currents being indicative of useful parameters of the active elements.

This invention relates to the measurement of alternating current (AC) parameters of active elements, and more particularly to the measurement of AC parameters of active elements measured while the same are connected in circuits with unknown impedances. This is a continuation-in-part of copending application Ser. No. 232,975, filed Oct. 25, 1962, by Louis W. Erath and now abandoned.

Determining any of the AC parameters of an active element (parameters such as gain or linearity) usually involves the steps of applying an AC signal to the input of the active element, measuring the amplitude of the input signal, and then measuring a resulting AC signal at the output of the active element. This procedure presents little difficulty when the measurements are made upon components not connected within a circuit. However, when the component is to be tested is connected in a circuit with unknown in-circuit impedances, the true amplitudes of the input and output signals of the active element are difficult to measure since these measurements are affected to some unknown degree by the unknown in-circuit impedances.

For instance, in determining the AC current gain, often referred to as the AC beta, a measured AC current would normally be applied to the transistor base and then the AC collector current would be measured. The ratio of the AC base current to the AC collector current is the AC current gain of the transistor. If the transistor is connected in a circuit, however, only a portion of the applied measured current would flow through the base-emitter diode of the transistor, and an unknown portion of the current would unavoidably flow through the unknown in-circuit impedances. Hence, the amplitude measurement of applied current would be meaningless. Attempts at measuring the collector current, i.e., current flow through the collector-emitter circuit of the transistor, would provide equally meaningless results. The amplified current flow created by the transistor would only account for a portion of the measured collector current, the remainder being due to feed-through currents passing from the base to the collector via the in-circuit impedances.

Thus, it is apparent that conventional techniques for measuring AC parameters of active elements are not useful when testing components while these components are connected in their associated circuits. For active elements such as vacuum tubes, and many of the more complex active elements, such as amplifier circuits, this presents no significant problem, since these active elements could easily be removed or isolated from their associated circuits. Active elements such as transistors, on the other hand, are usually secured by means of solder connections and therefore cannot easily be removed and again connected. Furthermore, transistors and the like are often damaged by heat while being soldered in place, causing these components to become faulty even though a previous out-of-circuit test indicated that the component was operating properly.

Thus, it is an object of this invention to provide methods and apparatus for determining AC parameters of active elements while connected in their associated circuits.

It is another object of this invention to provide methods and apparatus for measuring the true input and/or the true output current of an active element while connected in an associated circuit in a manner whereby the effect of unknown in-circuit impedances is eliminated.

It is a further object to provide methods and apparatus for accurately measuring the AC gain of active elements in a manner whereby the measurements are unaffected by unknown in-circuit impedances.

A still further object is to provide methods and apparatus for determining the linearity of active elements connected in their associated circuits.

Yet another object of the invention is to provide several unique circuits which are useful in systems for measuring parameters of active elements.

The following specification, of which the accompanying drawings form a part, explains the manner in which the foregoing objects are attained in accordance with this invention. In the drawings:

FIGS. 6A and 6B are interrelated schematic diagrams illustrating, in detail, a system in accordance with the block diagram shown in FIG. 2;

FIG. 7 is a block diagram illustrating apparatus in accordance with a third embodiment;

FIG. 8 is a diagram illustrating various selected wave shapes which appear at various points in the system illustrated in FIG. 7;

FIG. 9 is a diagram illustrating various wave shapes which occur when the apparatus in FIG. 7 is utilized to measure AC current gain of an active element; and FIGS. 10A and 10B are interrelated schematic diagrams illustrating, in detail, a system in accordance with the block diagram of FIG. 7.

GENERAL DESCRIPTION

Figure 1:
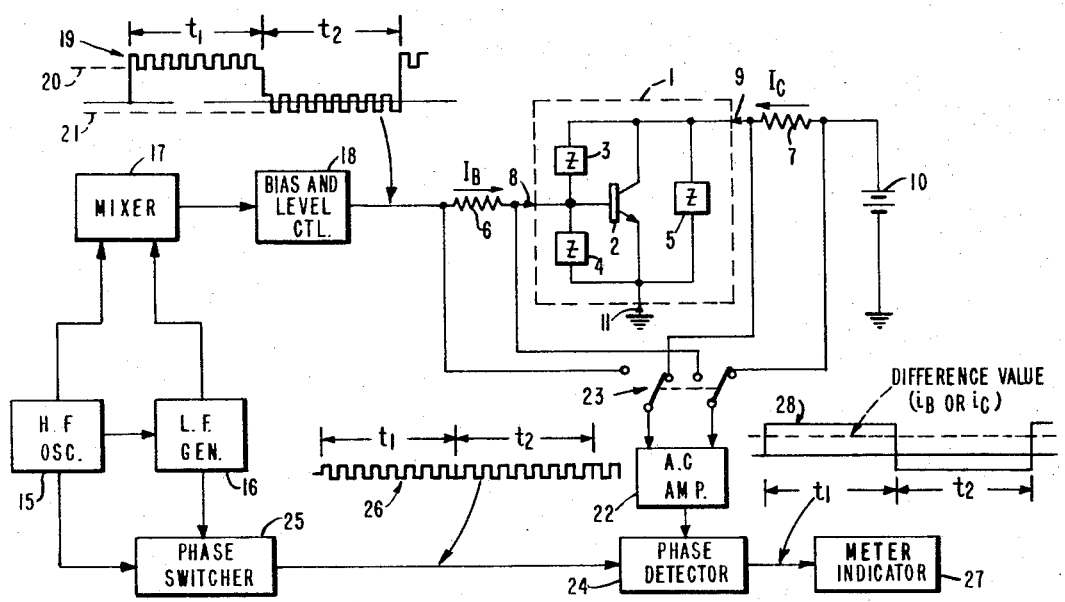
FIG. 1 is a block diagram illustrating apparatus in accordance with one embodiment of the invention.

Briefly, active elements are tested in accordance with the method of this invention by first applying the AC signal when the active element is inoperative or nonconductive, and then applying the AC signal when the active element is operative or conductive. In testing a transistor, for example, the AC signal is first applied at a DC bias level which maintains the transistor nonconductive. Any AC current measured at either the base (input current) or collector (output current) of the transistor flows only through the unknown in-circuit impedances and not through the transistor under test. The AC signal is thereafter again applied, but at a DC bias level which renders the transistor conductive. Current measured at the base or collector of the transistor under these circumstances flows both through the transistor and through the unknown in-circuit impedances. The in-circuit impedances are passive elements and therefore AC current flow through these elements is not affected by the change in DC bias level. If the measured AC current flow at one bias level is subtracted from the measured AC current flow at the other bias level, the difference is the true AC current flow through the transistor when it is conductive, since current flow through the in-circuit impedances is the same in both measurements and therefore cancels out. The ratio between the true input, or base, current compared to the true output or collector current, is the AC current gain of the transistor.

If both DC bias levels are selected so as to render the transistor conductive, then the difference between the measured AC output current at these bias levels is an indication of linearity. In other words, if the active element is linear in its operation, the amplitude of the AC signal at the output should be the same at both DC bias levels. If a difference in the measured amplitudes of the signals exists, this difference is an indication of the extent of nonlinearity. DC current flow through the passive in-circuit impedances is the same at both DC bias levels, therefore the effect of current flow through the in-circuit impedances is cancelled out when the difference is derived.

The apparatus in accordance with this invention includes a signal generator which provides a composite low-frequency, square-wave signal modulated with a high-frequency, square-wave signal. This composite test signal includes an AC signal (high-frequency square wave) at two different DC bias levels as determined by the low-frequency square wave. A phase detector circuit is combined with a slow response DC meter and is utilized to derive an indication proportional to the difference in the AC current flow at the different DC bias levels. The phase detector is synchronized by a signal from the signal generator, and is operative to rectify the measured current flow signal so that a DC signal of one polarity is derived that is proportional to the amplitude of the measured AC current flow while the apparatus operates at one bias level, and so that a DC signal of the opposite polarity is derived that is proportional to the amplitude of the measured AC current flow while the apparatus operates at the other bias level. The slow response DC meter indicates the average value of this bipolar DC signal, which is the difference in the amplitudes of the AC current signals at the two DC bias levels. In accordance with one embodiment of the invention, the bipolar signal is derived by inverting the phase of the high-frequency square-wave portion of the composite test signal during alternate half-cycles of the low-frequency signal and by using the noninverted high-frequency signal to synchronize the operation of the phase detector. In another embodiment, the high-frequency signal used to synchronize the phase detector is phase inverted during alternate half-cycles of the low-frequency signal. In either case, however, the DC meter indicates the amplitude of the true AC current flow through the active element.

When this apparatus is used to measure AC current gain of an active element, the DC bias levels are first adjusted so that the active element is operative at one bias level and not operative at the other. The measuring circuit is connected to measure the true AC output current of the active element, and the amplitude of the test signal is then adjusted until the true output current reaches a predetermined amplitude. Thereafter, the measuring circuit is connected to measure the true AC input current which, by appropriate calibration of the meter scale, can be read as the value of the AC current gain. If the apparatus is used to measure linearity, the DC bias levels are selected so that the active element is operative or conductive at both of these DC bias levels. The measuring apparatus is then connected to measure DC output current. If the active element is linear in its operation, the meter indication is zero. If a meter indication does exist, it is an indication of the nonlinearity of the active element.

In accordance with one embodiment of the invention, an automatic level control circuit is utilized which is responsive to the true amplitude of the AC output current of the active element. The level control circuit operates automatically to adjust the amplitude of the test signal so as to derive an output signal of a predetermined amplitude. A measuring circuit connected to measure the true input current then provides a direct indication of the AC gain of the active element.

*Apparatus with phase switched synchronizing signal*

Figure 3:
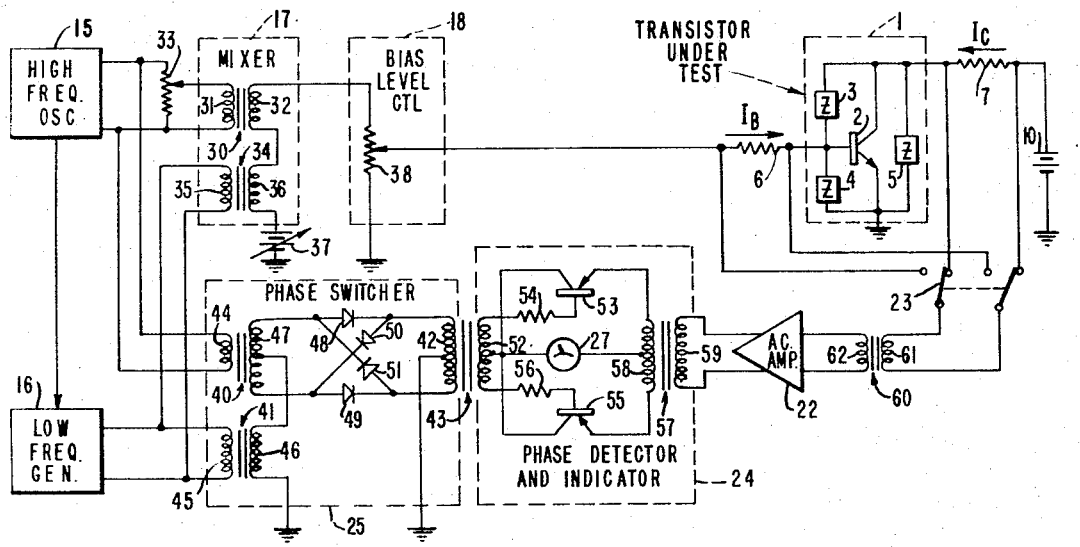
FIG. 3 is a schematic diagram illustrating, in greater detail, the system shown in block form in FIG. 1.
Figure 4:
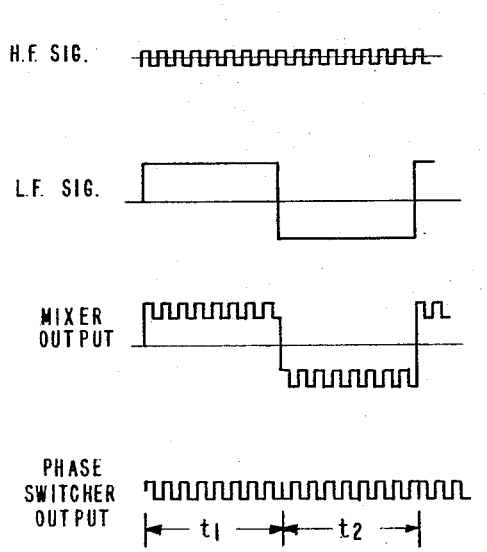
FIG. 4 is a diagram illustrating several selected wave shapes appearing in the apparatus illustrated in FIG. 3.
Figure 5:
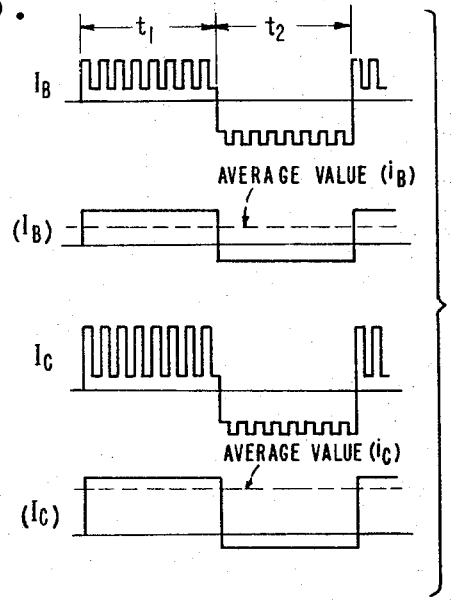
FIG. 5 is a diagram illustrating various selected wave shapes of the measured input and output currents as they occur when the system in FIG. 3 is utilized to measure AC current gain.

One embodiment of the invention, in which the phase detector synchronizing signal is phase switched, is shown in block diagram form in FIG. 1 and is described in greater detail with respect to FIGS. 3–5. The apparatus is shown connected to a transistor circuit 1, which is illustrative of a circuit including an active element which is to be tested. Circuit 1 includes an NPN type transistor 2 having an impedance element 3 connected between the base and collector, an impedance element 4 connected between the base and emitter, and an impedance element 5 connected between the collector and emitter. Impedance elements 3–5 are representative of the unknown in-circuit passive impendances usually found connected to the active element.

A test signal is applied to the base of transistor 2 via a resistor 6 which is connected to the base of the transistor by means of a probe 8. Collector potential is provided by a battery 10 having its negative terminal connected to ground and its positive terminal connected to the collector of transistor 2 via a resistor 7 and probe 9. The emitter of transistor 2 is connected to ground through a probe 11. Probes 8, 9 and 11 can be alligator clips, or any other suitable devices for making temporary connections.

When an AC signal is applied to resistor 6, an AC current $I_B$ flows through the resistor to provide a potential across resistor 6 proportional to the current flow therethrough. The AC current $I_B$ is not the true base current of the transistor, since a portion of the applied current bypasses the transistor and flows through impedance elements 3, 4 and 5. Likewise, the AC current flow $I_C$, passing through resistor 7, is not the true collector current. A portion of the AC signal applied via resistor 6 passes through impedance elements 3–5, particularly impedance element 3, and therefore affects the amplitude of the AC current flow $I_C$ through resistor 7.

The true AC input current which flows through the base-emitter circuit of the transistor, the true AC output current which flows through the collector-emitter circuit of the transistor, the AC current gain, and the linearity of the transistor can be accurately determined in accordance with the method of this invention without removing the transistor from its associated circuit. These parameters can be determined with or without the automatic circuit apparatus forming the remainder of the system shown in FIG. 1.

An NPN type transistor does not become conductive until a positive potential is applied to the base of the transistor which exceeds the forward conducting threshold voltage of the base-emitter diode. This potential is typically about 0.4 volt. Thus, if a negative bias is maintained on the base of transistor 2 which is sufficiently large to prevent the AC signal applied to the base of the transistor via resistor 6 from ever exceeding the forward conducting threshold voltage, transistor 2 remains fully nonconductive. Under these circumstances, the AC current $I_B$ flows only through impedance elements 3–5 and not through the transistor. Also, the AC current $I_C$ flowing through resistor 7 is a result of feedthrough current via impedance elements 3–5, since there is no current flow through the transistor collector-emitter circuit. Accordingly, measurement of the AC currents under these circumstances is a measurement of the amplitude of the current flow as though transistor 2 were disconnected from the circuit.

Next, the same AC signal is again applied to the transistor via resistor 6, but at a positive bias level. The amplitude of the AC signal, and the amplitude of the positive bias level are selected so that the base potential remains above the forward conducting threshold potential of the transistor, and below the base potential which would drive the transistor into saturation. The AC current flow $I_B$ now includes the AC current flow through the base-emitter circuit of the transistor, as well as the current flow through impedance elements 3–5. The amplitude of the AC current flow through passive impedance elements 3–5 is not affected by the change in DC bias level and therefore the AC current flow through these elements is the same as that previously measured when the transistor was nonconductive. Therefore, if the amplitude of $I_B$ measured when the transistor is conductive is subtracted from the amplitude of $I_B$ measured when the transistor is nonconductive, the difference is the true AC current flow, designated $i_B$ for convenience, through the base-emitter circuit of the transistor. The true AC collector current $I_C$ is determined in similar fashion. The AC current $I_C$ through resistor 7, when the AC signal is applied at the positive DC bias level, includes the AC current flow through the collector-emitter circuit of the transistor and the AC feedthrough current via impedance elements 3–5. This AC feedthrough current is not affected by the change in bias level and thus, if the feedthrough current measurement is subtracted from the combined measurement, the difference is the true AC collector current $i_C$.

The determined values of $i_B$ and $i_C$ in themselves provide meaningful information concerning the characteristics of the transistor under test. For example, the measured base current $i_B$ can be compared to the potential of the applied AC signal to derive an indication of the input impedance characteristic of the transistor. The ratio of $i_C$ to $i_B$ is the small signal AC current gain of the transistor and hence can easily be calculated.

In determining linearity, the AC signal is applied at two different DC bias levels, both of which are within the range of bias levels which render the transistor conductive. If the transistor is linear, both measured values of $I_C$ are the same. If the values are different, one measured value is subtracted from the other and the difference indicates the extent of nonlinearity. The effect of current flow through impedance elements 3–5 cancels out when the measured values are subtracted from one another, and therefore, the size of impedance elements 3–5 does not influence the difference indication.

The apparatus for automatically measuring these parameters includes a high frequency oscillator 15 coupled to a low frequency generator 16. The high frequency oscillator is preferably a conventional saturable core oscillator of the type which produces a square wave output signal and which operates at a frequency in the range of one kilocycle. The low frequency generator can be a separate, phase synchronized, square wave oscillator or a binary type frequency divider. The output signal from oscillator 15 should have a frequency at least sixteen times the frequency of the signal provided by low frequency generator 16. The outputs from the high frequency oscillator and the low frequency generator are combined in a mixer circuit 17 so that the high frequency is superimposed on the low frequency signal, or, in other words, so that the low frequency signal is modulated by the high frequency signal. The output from mixer circuit 17 is supplied to resistor 6 via a bias and level control circuit 18 which attenuates the signal and establishes one of the DC bias levels. Waveform 19 represents the composite test signal as it emerges from the bias and level control circuit. During the time interval $t_1$ (half-cycle of the low frequency signal), the high frequency AC signal is at a positive DC bias level 20, which is sufficient to render transistor 2 conductive. During the time interval $t_2$, the same AC signal is applied at a negative DC bias level 21, which maintains the transistor nonconductive. Thus, during the time interval $t_2$, AC current $I_B$ flows only through impedance elements 3–5, and during time interval $t_1$, AC current $I_B$ flows through both transistor 2 and impedance elements 3–5.

The measuring circuit includes an AC amplifier which is connectable across either resistor 6 or resistor 7 by means of a double pole, double throw switch 23. Thus, when switch 23 is in the position shown in FIG. 1, the AC amplifier responds to the potential developed across resistor 7, which is proportional to the AC current flow $I_C$. When switch 23 is in the other position, the AC amplifier responds to the potential developed across resistor 6, which is proportional to AC current flow $I_B$. The frequency response of amplifier 22 is such that the amplifier will respond to the high frequency square wave signal, but will not respond to DC signals or the low frequency square wave signal.

The output of the AC amplifier is connected to a phase detector circuit 24 which also receives a synchronizing signal from a phase switching circuit 25. The phase switching circuit receives the output signal from high frequency oscillator 15 and low frequency generator 16. This switching circuit is operative to reverse the polarity of the high frequency signal during every alternate half-cycle of the low frequency signal. Waveform 26 is the synchronizing signal as it appears emerging from the phase switching circuit. During time interval $t_1$, the synchronizing signal is the same as the output signal from high frequency oscillator 15, but during time interval $t_2$, the polarity is reversed, or, in other words, the phase is shifted 180 degrees.

Waveform 28 represents the output signal from phase detector 24. From this waveform, it can be seen that the phase detector rectifies the AC signal from amplifier 22 to derive a DC signal of one polarity during time interval $t_1$, and a DC signal of the opposite polarity during time interval $t_2$. If switch 23 is in the position shown in FIG. 1, the phase detector provides a positive output signal during time interval $t_1$ which has an amplitude proportional to the amplitude of the AC current $I_C$. During time interval $t_1$, transistor 2 is conductive, since the test signal (waveform 19) is at the positive bias level during time interval $t_1$. During time interval $t_2$, when the transistor under test is nonconductive, the phase detector provides a negative output signal having an amplitude which is proportional to the amplitude of the AC current $I_C$. Meter indicator 27 is a slow response DC meter which responds to the average value of the bipolar signal represented by waveform 28, this average value being the difference in the amplitude of the positive portion of the signal as compared to the negative portion. Hence, this difference value is proportional to the AC current $i_C$ which is the true AC collector current. If switch 23 is moved to the other position, the measuring circuit operates in essentially the same manner to measure the true AC base current $i_B$. By appropriate calibration of the meter scale plate, the value of the true AC base and collector currents can be read directly from the meter.

If the apparatus is used to measure AC current gain of the transistor under test, switch 23 is first placed in the position shown in FIG. 1. Bias and level control circuit 18 is then adjusted to vary the amplitude of the test signal until a predetermined true collector current $i_C$ is indicated on the meter, this predetermined indication being designated by means of a calibration mark on the scale plate of the meter. Thereafter, switch 23 is moved to the other position so that the corresponding value of $i_B$ can be measured. The AC gain is the ratio between these measured indications of true collector current and true base current. The meter scale plate can be calibrated in terms of AC current gain since the value of true collector current $i_C$ is always set to a predetermined constant value, thereby eliminating the need for separate calculations.

For measuring linearity, the bias and level control circuit is adjusted so that both DC bias levels 20 and 21 are positive, thus rendering the transistor alternately conductive at two different bias levels. Switch 23 is then placed in the position shown in FIG. 1, so that the meter will indicate the difference in the amplitude of the AC collector current at the two different bias levels. If the transistor is linear in its operation, there is no difference and the meter indication is zero. Any difference which does exist is an indication of the extent of nonlinearity, and by appropriate calibrations on the meter scale plate, the indication of nonlinearity can be read directly from the meter.

Several of the component circuits shown in FIG. 1 are illustrated in greater detail in FIG. 3. Like components are designated by like reference numerals.

The output of high frequency oscillator 15 is connected to the primary winding 31 of a transformer 30 in mixer circuit 17 via a variable voltage divider resistor 33. The output of the low frequency generator is connected to a primary winding 35 of a transformer 34 also in the mixer circuit. Secondary windings 32 and 36 of transformers 30 and 34, respectively, are connected in series with one another, with the other end of winding 36 being connected to ground via a variable source of potential 37, and with the other end of winding 32 being connected to ground via a voltage divider resistor 38. Resistor 38 and variable potential source 37 form the bias and level control circuit 18. The variable tap of resistor 38 is connected to the base of transistor 2 via resistor 6.

The high frequency and low frequency signals provided by high frequency oscillator 15 and low frequency generator 16, respectively, are shown in FIG. 4. These signals are added to one another by means of the series connection between windings 32 and 36, thereby deriving the composite test signal designated as the "mixer output" in FIG. 4. If potential source 37 is disregarded, the mixer output signal would have a zero reference level, as shown in FIG. 7. Variable potential source 37 is preferably of the type which can provide any desired positive or negative potential and thereby operates to shift the reference level of the mixer output signal to any desired value. Voltage divider 33 varies the amplitude of the high frequency signal without affecting the amplitude of the low frequency signal and voltage divider 38 varies the amplitude of the composite test signal applied to the test transistor via resistor 6. Thus, by appropriately adjusting resistors 33 and 38 and variable potential source 37, a composite test signal can be obtained having any desired DC bias levels and any desired AC signal amplitude.

Phase switcher 25 includes a transformer 40 and a transformer 41, as well as the center-tapped primary winding 42 of a transformer 43. The primary winding 44 of transformer 40 is connected to the output of high frequency oscillator 15 and the primary winding 45 of transformer 41 is connected to the output of low frequency generator 16. One end of secondary winding 46 of transformer 41 is connected to ground and the other end is connected to the center-tap of a secondary winding 47 of transformer 40. The ends of winding 47 are connected straight through to the ends of winding 42 via diodes 48 and 49, the ends of winding 47 being connected to the anodes of these diodes. The ends of winding 47 are also connected to opposite ends, respectively, of winding 42 by a cross connection via diodes 50 and 51, winding 47 being connected to the cathodes of diodes 50 and 51. The center-tap of winding 42 is connected to ground.

When the low frequency signal across winding 46 is such that the center-tap of winding 47 is positive, diodes 48 and 49 are conductive and diodes 50 and 51 are back biased. Under these circumstances, the straight through connection is completed between windings 47 and 42, and therefore the high frequency signal is transferred from winding 47 to winding 42 without any polarity reversal. During the alternate half-cycle of the low frequency signal, the center-tap of winding 47 becomes negative, thereby back biasing diodes 48 and 49 and rendering diodes 50 and 51 conductive. Accordingly, the high frequency signal is now transferred from winding 47 to winding 42 via the cross connection, which reverses the polarity of the signal, thereby achieving a 180 degree phase shift. The signal which appears across secondary winding 52 of transformer 43 is shown in FIG. 4 and is designated as the "phase switcher output." Note that, during time interval $t_2$, the high frequency signal is shifted 180 degrees when compared to the high frequency signal during time interval $t_1$.

Phase switcher circuit 25 provides the phase switch synchronizing signal for phase detector circuit 24 via transformer 43. The other input for the phase detector is applied through a transformer 57 having a primary winding 59 and a center-tapped secondary winding 58. A primary winding 61 of a transformer 60 is connected to the stationary contacts of switch 23. The secondary winding 62 of transformer 60 is connected to the input of an AC amplifier 22, and the output of the amplifier is connected to primary winding 59. Thus, if switch 23 is in the position shown in FIG. 3, a signal designated $I_C$ in FIG. 5 is applied to the input of AC amplifier 22. If switch 23 is in the opposite position from that shown in FIG. 3, the signal designated $I_B$ is applied to the input of the AC amplifier. Amplifier 22 has a frequency response characteristic such that only the high frequency portion of the signal passes through the amplifier and the low frequency portion corresponding to the changing bias levels is blocked by the amplifier. Thus, the signal appearing across primary winding 59 during the time interval $t_1$ when the test transistor is conductive is a high frequency AC signal having an amplitude proportional to the amplitude of AC current flow through the transistor under test and the impedance elements. The signal applied to primary winding 59 during time interval $t_2$, during which the test transistor is nonconductive, is an AC signal having an amplitude proportional to the amplitude of AC current flow through the impedance elements alone.

The phase detector circuit includes two PNP type transistors 53 and 55. The ends of winding 58 are connected, respectively, to the emitters of these transistors and the ends of winding 52 are connected to the bases of these transistors via resistors 54 and 56, respectively. The collectors of the transistors are connected to the center-tap of winding 52. A slow response DC meter 27, which provides the output indication, is connected between the center-taps of windings 52 and 58.

During the time interval $t_1$, the signals applied to transformers 43 and 57 are in phase with one another. The synchronizing signal appears across winding 52 and is applied to bases of the transistors, rendering them alternately conductive. Accordingly, the transistors full-wave rectify the signal appearing across winding 58, and therefore a DC current flows through meter 27. This current flow may be considered positive and has an amplitude proportional to the amplitude of the AC signal appearing across winding 58. During the time interval $t_2$, the signals across windings 52 and 58 are 180 degrees out of phase. The transistors still full-wave rectify the signal across winding 58, but this time the DC current flows in the opposite direction through meter 27, and thus may be considered negative.

The amplitude of the synchronizing signal across winding 52 should be several times as large as the signal appearing across winding 58, so that the transistors become fully conductive in the saturated region when a negative base potential is applied. Thus, when a negative potential is applied to the base of one of the transistors, it becomes fully conductive and offers no significant impedance to current flow in either direction through the emitter-collector circuit of the transistor.

If switch 23 is in the position shown in FIG. 3, the signal appearing across meter 27 is represented by the waveform designated ($I_C$) in FIG. 5. The positive portion of this signal has an amplitude proportional to the amplitude of the high frequency AC signal during the time interval $t_1$. The negative portion of this waveform has an amplitude proportional to the amplitude of the AC signal during the time interval $t_2$. Meter 27 provides an indication corresponding to the average value of this waveform, which is the difference between the positive amplitude and the negative amplitude. This average value is the true collector current $i_C$. If switch 23 is placed in the opposite position from that shown in FIG. 3, the signal appearing across meter 27 is represented by the waveform ($I_B$). Meter 27 provides an indication corresponding to the average value of this signal which is the true base current $i_B$ of the test transistor.

*Apparatus with phase switched test signals*

Figure 2:
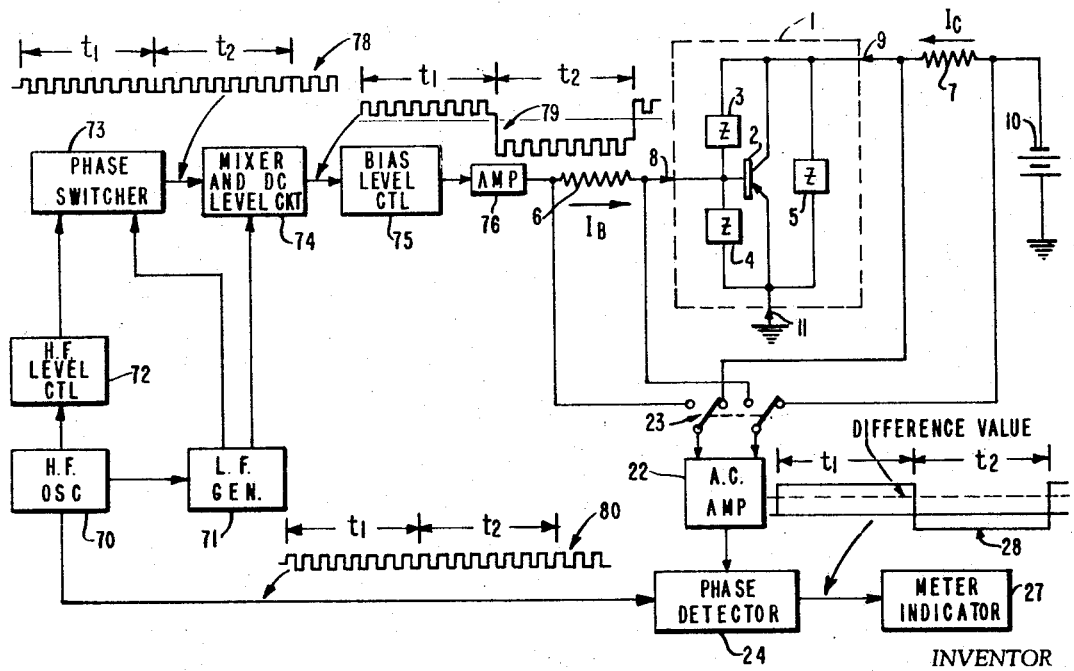
FIG. 2 is a block diagram illustrating apparatus in accordance with a second embodiment of the invention.

The system illustrated in block form in FIG. 2, and in greater detail in FIGS. 6A and 6B, is similar to the system described in FIG. 1, except that the high frequency signal portion of the composite test signal is phase switched instead of the synchronizing signal applied to the phase detector. The circuit including the transistor under test and the measuring circuits are the same as in FIG. 1 and therefore like reference numerals are employed.

A high frequency square wave signal is produced by an oscillator 70, which can be a conventional saturable reactor type oscillator operating in the range of one kilocycle. A low frequency generator, preferably a binary frequency divider circuit, provides a synchronized low frequency square wave signal. The high frequency signal is applied to a phase switcher circuit 73 via an HF level control circuit which is a variable attenuator for controlling the amplitude of the high frequency signal. The phase switcher circuit also receives a low frequency signal from low frequency generator 71 and is operative to reverse the polarity of the high frequency signal during every alternate half-cycle of the low frequency signal. Waveform 78 represents the phase switched signal emerging from phase switcher circuit 73. During the one half-cycle of the low frequency signal, designated as time interval $t_1$, the signal emerging from the phase switcher circuit is the same as the high frequency signal provided by oscillator 70. During the alternate half-cycle of the low frequency signal, designated as time interval $t_2$, the polarity of the high frequency signal is reversed, or, in other words, the high frequency signal is shifted 180 degrees.

The phase switched signal from phase switcher circuit 73 is supplied to a mixer and DC level circuit 74, which also receives a low frequency signal from low frequency generator 71. The mixer and level control circuit combines the phase switched signal, represented by waveform 78, with the low frequency signal, to thereby derive a composite test signal represented by waveform 79. Circuit 74 also established the DC bias levels so that the composite test signal, as shown by waveform 79, is positive during time interval $t_1$ and slightly negative during time interval $t_2$. The composite test signal is applied to resistor 6 via a bias level control circuit 75 and a base drive amplifier 76. The bias level control circuit is a variable attenuator that adjusts the amplitude of the composite test signal. Base drive amplifier 76 amplifies this composite test signal and applies this amplified signal to resistor 6 with the appropriate impedance match. It should be noted that waveform 79 in FIG. 2 is similar to waveform 19 shown in FIG. 1 except for the phase shift of the high frequency portion of the signal during the time interval $t_2$.

A high frequency output signal from oscillator 70 is applied directly to phase detector circuit 24 as the synchronizing signal. Thus, during the time interval $t_1$ the signal derived from the composite test signal and applied to phase detector 24 via AC amplifier 22 is in phase with the synchronizing signal, and, therefore, the phase detector output is positive. During time interval $t_2$ the signal from AC amplifier 22 is 180 degrees out of phase with respect to the synchronizing signal, and, therefore, the output from the phase detector is negative. Meter indicator circuit 27 measures the average value of the signal emerging from phase detector 24, this signal being represented by waveform 28.

The operation of the apparatus in measuring the true AC base current $i_B$, the true collector current $i_C$, the AC current gain of the transistor, and the linearity thereof, is identical to the operation previously described with respect to the system illustrated in FIG. 1.

The system illustrated in FIG. 2 is more completely shown in FIGS. 6A and 6B, which can be combined to form a single schematic diagram with FIG. 6A to the left and FIG. 6B to the right.

The high frequency oscillator includes a saturable reactor 85 having three center-tapped windings, 86, 87, and 88. The oscillator also includes a pair of PNP type transistors 89 and 90. The bases of these transistors are each connected to a different end of winding 86, and the collectors thereof are each connected to a different end of winding 87. The emitters of these transistors are connected to ground. The center-tap of winding 86 is connected to the junction between a pair of resistors 91 and 92, these resistors being connected in series between a negative source of potential and ground, thereby maintaining the center-tap of winding 86 slightly negative. The center-tap of winding 87 is connected to the negative source of potential and a capacitor 93 is connected across winding 87.

The slight negative potential at the center-tap of winding 86 initially tends to render both transistors somewhat conductive, but due to the inherent mismatch of characteristics, one of the transistors becomes more conductive than the other. For discussion, it is assumed that transistor 89 is the transistor becoming more conductive. Current begins to flow through the emitter-collector circuit of transistor 89 and through one-half of winding 87 to the negative source. Winding 86 is oriented with respect to winding 87 so that this current flow induces a potential across winding 86 which is negative at the base of transistor 89. Thus, transistor 89 becomes further conductive and, by means of the regenerative feedback through windings 86 and 87, rapidly becomes fully conductive. Operation continues in this fashion until the core of saturable reactor 85 reaches saturation, at which time no further potential is induced in winding 86, thus rendering transistor 89 abruptly nonconductive. The reactance of winding 86 produces a reversal of potential, thereby rendering transistor 90 slightly conductive, after which transistor 90 rapidly becomes fully conductive by means of regenerative feedback through windings 86 and 87. Accordingly, transistors 89 and 90 alternately become conductive to provide a square wave output signal across windings 87 and 88, this output signal having a frequency determined primarily by the saturable reactor characteristics. The saturable reactor is preferably selected so that oscillator 70 operates at a frequency of approximately one kilocycle.

A portion of the output signal from oscillator 70 is taken off one end of winding 87 and supplied to a multiple stage, binary type frequency divider which forms low frequency generator 71. The first stage of the frequency divider is a conventional flip-flop circuit including a pair of PNP type transistors 106 and 107. The collector of transistor 107 is connected to the base of transistor 106 via a parallel circuit combination of resistor 110 and capacitor 109 and the collector of transistor 106 is connected to the base of transistor 107 via a parallel circuit combination of resistor 112 and capacitor 111. Components 109–112 provide the cross connections between the transistors so that when one transistor is conductive the other is maintained nonconductive. Resistor 113 and diode 114 provide an input circuit for transistor 106 and in like fashion resistor 117 and diode 116 provide an input gate circuit for transistor 107. If, for example, transistor 106 is initially conductive and transistor 107 is initially nonconductive, diode 114 is forward biased while diode 116 is back biased. Thus, when the output signal from oscillator 70 changes in a positive direction, a positive pulse passes through capacitor 115 and renders transistor 106 nonconductive. As a result of the cross connections between the transistors, transistor 107 automatically becomes conductive. The next positive change of potential in the output of oscillator 70 causes a positive pulse to pass through diodes 116 and renders transistor 107 nonconductive. Accordingly, the output signal from the first frequency divider stage, as it appears on the collector of transistor 106, is a square wave signal having one-half of the frequency of the high frequency signal from oscillator 70.

The output signal from the first stage is applied to the base of PNP transistors 120 and 121 in the second stage via capacitors 127 and 126, respectively. Resistors 122 and 124, along with their parallel capacitors 123 and 125, provide the cross connections between the transistors, thereby forming a flip-flop circuit. The output from the second stage is taken from the collector of transistor 120 and is applied to the bases of transistors 130 and 131 in the third stage. Resistors 132 and 134, along with their parallel connected capacitors 133 and 135, provide the cross connections between transistors 130 and 131. The flip-flop circuits forming the second and third stages each divide the frequency by one-half. Any number of additional flip-flop circuits can be inserted between the second and third stages of frequency dividers to achieve any desired difference in frequency between the high frequency signal and the low frequency signal. In order to derive the waveform shown in FIG. 2, a fourth flip-flop circuit is added. With four stages in the frequency divider, the square wave output signal from the low frequency generator, which appears at the collector of transistor 130, is divided by a factor of sixteen when compared to the high frequency signal provided by oscillator 70.

The low frequency signal is applied to phase switcher circuit 73 and mixed circuit 74 via transformer 103 having a primary winding 106, a center-tapped secondary winding 104, and a secondary winding 105. More specifically, one end of winding 106 is connected to the negative source of potential and the other end is connected to ground via the collector-emitter circuit of a PNP type transistor 107. The low frequency signal, which appears at the collector of transistor 130, is coupled to the base of transistor 107 via a resistor 108. Thus, when the low frequency signal is negative, transistor 107 is rendered conductive and current flows through winding 106, whereas when the low frequency signal is zero or positive, transistor 106 is nonconductive and therefore no significant current flows through winding 106. The low frequency signal therefore appears across windings 104 and 105 of transformer 103.

The high frequency signal is applied to phase switcher circuit 73 via HF level control circuit 72, comprising a variable tap resistor 96. One end of resistor 96 is connected to one end of winding 87 via a resistor 94 and the other end is connected to the other end of winding 87. Capacitor 95 is connected across resistor 96. The primary winding 98 of a transformer 97 is connected between the variable tap and one end of resistor 96. The high frequency signal therefore appears across the center-tapped secondary winding 99 of transformed 97, and the amplitude of this signal can be controlled by appropriate adjustment of variable tap on resistor 96.

In addition to windings 99 and 104, the phase switcher circuit includes a pair of PNP type transistors 100 and 101. The emitters of these transistors are connected to opposite ends of winding 99 and the bases thereof are connected to opposite ends of winding 104. The collectors are connected together and to the center-tap of winding 104 via a resistor 102. The phase-switched output signal appears between the center-taps of windings 99 and 104. During one-half cycle of the low frequency signal, the potential across winding 104 maintains the base of transistor 100 negative, thereby rendering transistor 100 conductive. Under these circumstances, the phase switcher circuit output signal is derived from the upper half of winding 99. During the next half-cycle of the low frequency signal, the base of transistor 101 becomes negative to render transistor 101 conductive. While transistor 101 is conductive, the output signal is derived from the lower half of winding 99. Therefore, it is apparent that the phase of the output signal is shifted 180 degrees during every alternate half-cycle of the low frequency signal. The high frequency signal, the low frequency signal, and the phase switcher output signal, respectively, are the same as the corresponding waveforms designated in FIG. 4.

The amplitude of the low frequency signal appearing across winding 104 should be several times the amplitude of the high frequency signal appearing across winding 99, thereby insuring that transistors 100 and 101 are driven into saturation when rendered conductive. It is pointed out that when a transistor is rendered conductive, current can flow in either direction through an emitter-collector circuit. Thus, transistors 100 and 101 can be considered as switches which first permit the AC signal from one end of winding 99 to reach the output, and then permit the AC signal from the other end of winding 99 to reach the output.

In considering mixer circuit 74, it can be assumed that winding 105 is connected in series with either the upper or lower half of winding 99, depending upon whether transistor 100 or transistor 101 is conductive. A variable resistor 142 is connected in series with a variable tap, voltage divider resistor 143, and this series combination is connected across the series combination of windings 105 and 99. Thus, a low frequency signal is added to the phase switched signal to derive the composite test signal which appears across resistor 143 with the high frequency phased switch portion of the signal superimposed upon the low frequency signal. More specifically, one end of winding 105 is connected to ground and the other end is connected to the center-tap of winding 104. The center-tap of winding 99 is connected to ground via resistors 142 and 143.

The junction between windings 104 and 105 is connected to the negative source of potential via a semiconductor diode 139 in series with a resistor 140, the cathode of the diode being connected to winding 105. A diode 138 is connected across winding 105 with the anode of the diode connected to the junction between windings 104 and 105. When the low frequency signal across winding 105 is such that a positive potential is produced with respect to ground, diode 138 becomes conductive and limits this potential to the forward conducting threshold voltage of the diode, which is typically about 0.4 volt. During the alternate half-cycle of the low frequency signal, winding 105 provides a negative potential which is clamped by diode 139 at a potential level equal to that of the negative source of potential. Accordingly, the composite test signal becomes negative during one half-cycle of the low frequency signal and then becomes slightly positive during each alternate half-cycle. It should be noted at this time that this composite test signal is applied to a transistor 2 under test (FIG. 6B) which is of the PNP type. Accordingly, this transistor becomes conductive during the negative portion of the signal and is maintained nonconductive when the signal becomes slightly positive. A similar circuit could easily be constructed, replacing the one including diodes 138 and 139 if a composite signal were desired for a NPN type transistor. This modified bias level circuit would provide a composite test signal which becomes positive and then slightly negative.

The variable tap of resistor 143 is connected to the input of base drive amplifier 76 which amplifies the composite test signal and applies the same to the base of transistor 2 via resistor 6. Base drive amplifier 76 is of conventional design, including three stages of amplification achieved by transistors 146, 147, and 148. Transistor 148 is preferably connected in emitter-follower configuration, so that a low impedance output signal is provided. It is desirable that the impedance, as seen from the base of transistor 2, be very low. Transistor 149 is connected to provide current feedback so that the effective impedance seen from the base of the transistor under test is of a very nominal value.

Double pole, double throw switch 23 connects the primary winding 151 of a transformer 150 across either resistor 6 or resistor 7. The collector-emitter circuit of a PNP type transistor 158 is connected across secondary winding 153 of transformer 150 to block transient currents caused by changes in the DC bias levels, and therefore the transient currents cannot pass through transformer 150. The collector of one transistor in each stage of the frequency divider forming the low frequency generator 71, except for the last stage, is connected to the base of transistor 158 via an AND circuit formed by diodes 128 and 129. Thus, transistor 158 is rendered conductive for a short period of time immediately following each transition of the flip-flop circuit including transistors 130 and 131. In other words, when transistors 107 and 121 are simultaneously nonconductive, an event which occurs immediately following each change of potential in the low frequency signal, transistor 158 becomes conductive and effectively short-circuits windings 153. This prevents any significant transfer of signal from the primary winding of transformer 150 to secondary winding 152.

A resistor 156 is connected in series with a resistor 157 between the negative source of potential and ground. These resistors produce a bias potential for transistors 158 and 170 at the junction between the resistors. This junction is connected to the base of transistor 158 via a diode 159, and to the base of transistor 170 via winding 152. AC amplifier 22 is a three-stage amplifier including transistors 170, 171, and 173, which are connected and operate in conventional fashion. The output signal from the amplifier is developed across winding 175 of a transformer 174, winding 175 being connected to the collector of transistor 173. Winding 176 of transformer 174 provides a feedback signal which is applied between the emitter of transistor 170 and the associated emitter resistor 178. Winding 176 provides negative feedback which improves the linearity and stability of the amplifier. It is also desirable that the emitter resistors of each of the transistors be bypassed by suitable capacitors to further improve linearity of the amplifier.

The center-tap secondary winding 177 of transformer 174 forms part of phase detector circuit 24. The phase detector circuit includes a pair of PNP type transistors 180 and 181. The emitters of these transistors are connected to opposite ends of secondary winding 177 and the bases of these transistors are connected to opposite ends of winding 88 in high frequency oscillator circuit 70. The collectors of these transistors are connected together and to the center-tap of winding 88 via resistor 183. A slow response DC meter 27 is connected in series with a resistor 182 between the center-tap of winding 177 and the common collector connection.

The operation of the phase detector circuit shown in FIG. 6B is essentially the same as that previously described in FIG. 3. If the signal across winding 177 is in phase with the signal provided across winding 88, a DC current will flow through meter 27 in one direction. If these signals are 180 degrees out of phase, current will flow through meter 27 in the opposite direction. As has previously been mentioned, phase switcher circuit 73 shifts the phase of the composite test signal 180 degrees during alternate half-cycles of the low frequency signal. Therefore, the signals applied to phase detector 24 will be in phase during one half-cycle of the low frequency signal, and 180 degrees out of phase during the alternate half-cycle.

Meter 27 provides an indication corresponding to the average value of the bipolar signal developed by the phase detector circuit. As has previously been explained with regard to FIG. 2, the average value is either the true base current of the test transistor or the true collector current, depending upon the position of switch 23.

*Apparatus with automatic level control*

When the systems illustrated in FIGS. 1 and 2 are used to measure AC current gain, it is necessary to place switch 23 in one position and manually calibrate the instrument, and then place switch 23 in the other position in order to obtain the indication of AC current gain. In some installations, such as automatic assembly line testing, it is desirable that the indication of AC current gain be derived without any manual switching or calibrating operations. An automatic system for eliminating the manual operations is shown in block form in FIG. 7. Waveforms appearing at various points in the apparatus are shown in FIGS. 8 and 9 and a detailed schematic diagram is shown in FIGS. 10A and 10B.

Referring first to FIG. 7, the system is illustrated connected to a transistor circuit 201 including an PNP type transistor 202. An impedance element 203 is shown connected between the base and collector of the transistor, an impedance element 204 is connected between the base and emitter of the transistor, and an impedance element 205 is shown connected between the collector and emitter of the transistor. These impedance elements are representative of unknown, in-circuit, passive impedances normally found in the associated circuit connected to the transistor under test.

A high frequency oscillator 211 provides the high frequency square wave signal and the low frequency generator 212 coupled thereto provides a lower frequency square wave signal. The operating frequency of the high frequency oscillator is preferably in the range of one kilocycle and the output signal from low frequency generator 212 is preferably divided by a factor of sixteen or more. The high and low frequency signals are applied to a mixer and phase shifter circuit 213. This circuit is operative to reverse the polarity of the high frequency signal during every alternate half-cycle of the low frequency signal. The high frequency signal, the low-frequency signal, and the corresponding phase switched signal are each illustrated in FIG. 8. The mixer portion of circuit 213 combines the phase switched signal with the low frequency signal, thereby deriving, at the output of circuit 213, the signal designated as the "mixer output" in FIG. 8.

The mixer output signal passes through a level control circuit 214, a base drive amplifier 215, a resistor 206, and is then applied to the base of transistor 202. Level control circuit 214 includes an attenuator which is automatically controlled to adjust the amplitude of the mixer output signal. Level control circuit 214 also includes a circuit for adding the DC reference levels to the mixer output signal. If a positive reference potential is added, the composite signal is suitable for application to an NPN type transistor, whereas if a negative reference potential is added, the composite signal is suitable for application to a PNP type transistor. The signal emerging from level control circuit 214 is illustrated in FIG. 8 with the positive reference potential added and is designated as the "level control output." Base drive amplifier 215 amplifies the signal and applies the same to the base of transistor 202 via resistor 206 with the appropriate impedance match.

The measuring portion of the system shown in FIG. 7 includes an AC amplifier 222 connected across resistor 206. The AC amplifier is responsive to the high frequency AC current $I_B$ passing through resistor 206. The output of the AC amplifier is supplied to the phase detector circuit 224 which receives a synchronizing signal from high frequency oscillator 211. The signals applied to phase detector circuit 224 will be in phase for one half-cycle of the low frequency signal, and will be 180 degrees out of phase during the alternate half-cycle. As a result, phase detector circuit 224 provides a bipolar output signal which is amplified by a DC amplifier 225 and applied to indicator circuit 227. The indicator circuit responds to the average value of the bipolar signal, this average value being the true base current $i_B$ applied to the base of test transistor 202. The portion of the system thus far described in FIG. 7 operates essentially the same as the system illustrated in FIG. 2, assuming switch 23 is in the position opposite from that shown in FIG. 2.

The collector potential for transistor 202 is provided by a voltage source 210 having its negative terminal connected to ground and its positive terminal connected to the collector of transistor 202 via a resistor 207 and a voltage control circuit 230. The AC current flow through transistor 202 and impedance elements 203–205 also flows through resistor 207, and hence provides a potential across the resistor which is proportional to the AC current flow $I_C$. Voltage control circuit 230 maintains the collector potential at a preselected voltage level.

Phase detector circuit 231 receives a synchronizing signal from high frequency oscillator 211, and also receives the AC potential developed across resistor 207 corresponding to current flow $I_C$. Phase detector 231 provides a bipolar signal whereby the positive portion has an amplitude proportional to current flow $I_C$, while transistor 202 is conductive, and a negative portion having an amplitude proportional to the amplitude of the current flow $I_C$ while transistor 202 is nonconductive. Level control circuit 231 is responsive to the average value at this bipolar signal and is connected to automatically control the attenuator in level control circuit 214. Level control circuit 232 varies the attenuation provided by the level control circuit 214 until the true AC collector $i_C$ reaches a selected predetermined value. Therefore, since it is known that the true collector current has a predetermined value, the measured true base current is indicated by meter 227, is directly proportional to gain. Accordingly, indicator 227 can be appropriately calibrated to indicate the gain measurement.

FIGS. 10A and 10B are a single schematic diagram which is formed with FIG. 10A to the left and FIG. 10B to the right. This schematic diagram illustrates, in greater detail, the system previously described in FIG. 7.

High frequency oscillator 211 includes a pair of PNP type transistors 243 and 244 and a saturable reactor 240, having five center-tapped windings 241, 242, 248, 285, and 286. DC potentials are supplied to the oscillator circuit by means of a voltage divider including resistors 245, 246, and 247 connected in series between a positive source of potential and ground. The emitters of transistors 243 and 244 are each connected to the junction between resistors 245 and 246. The center-tap of winding 248 is connected to the junction between resistors 246 and 247. The ends of winding 248 are connected, respectively, to the bases of the transistors. The collectors of the transistors are each connected to a different end of winding 241, the center-tap of this winding being connected to ground. A capacitor 249 is connected across winding 241 to absorb switching transients.

The potential at the center-tap of winding 248 is somewhat less positive than the potential applied to the emitters of the transistors, and therefore, both of the transistors initially tend to become conductive. However, due to the inherent mismatch of transistors characteristics, one of these transistors becomes more conductive than the other. Assume transistor 244 is the transistor becoming more conductive. Accordingly, current begins to flow from the positive source of potential through the emitter-collector circuit of transistor 244 and through one half of winding 241. Winding 248 is oriented with respect to winding 241 so that the corresponding potential induced in winding 241 renders the base of transistor 244 more negative. Accordingly, transistor 244 becomes more conductive and is soon driven into saturation because of the regenerative feedback established between windings 241 and 248. Operation continues in this fashion until the core of saturable reactor 240 reaches saturation, at which time no further potential is induced in winding 248 and therefore transistor 244 becomes nonconductive. Because of the reactance in winding 248, the potential across this winding reverses, thereby making the base of transistor 243 negative with respect to the emitter. Transistor 243 becomes somewhat conductive and so thereafter is driven into saturation by means of a regenerative feedback between windings 241 and 248. Thus, it can be seen that transistors 243 and 244 alternately become conductive to provide a square wave output signal which appears across windings 242, 286, and 285. The operating frequency of this oscillator is determined primarily by the characteristics of the saturable reactor. The saturable reactor is preferably selected so that the oscillator will operate at a frequency in the range of one kilocycle.

Low frequency generator 212 includes a frequency divider circuit 260 coupled with a flip-flop circuit 261. Frequency divider circuit 260 includes a unijunction transistor 255. Base-two of unijunction transistor 250 is connected to a positive source of potential via a resistor 260, and base-one thereof is connected to a negative source of potential via a resistor 257. The sizes of resistors 256 and 257 determine the magnitude of current flow through the interbase circuit of the unijunction transistor, which in turn determines the peak point voltage of the transistor. A capacitor 254 is connected between the emitter of the unijunction transistor and the negative source of potential. When the potential across capacitor 254 exceeds the peak point potential for unijunction transistor 255, the unijunction transistor becomes conductive and discharges the capacitor through resistor 257.

One end of winding 242 is connected to the emitter of transistor 255 via a resistor 250, a capacitor 251, and a diode 253, in that order, the cathode of diode 253 being connected directly to the emitter of unijunction transistor 255. The anode of a diode 252 is connected to the negative source of potential, and the cathode thereof is connected to the junction between capacitor 251 and diode 253.

Waveform 258 represents the high frequency signal appearing across winding 248. The DC reference level of this signal is removed by capacitor 251 and thereafter reapplied by diode 252, which therefore establishes the references potential at a negative value. Each positive portion of the high frequency signal passes through diode 253 and increases the potential across capacitor 254. Therefore, the potential across capacitor 254 increases in step-by-step fashion and is represented by waveform 259. The potential across capacitor 254 increases in this manner until it exceeds the peak point potential of unijunction transistor 255, at which time the transistor becomes conductive and discharges capacitor 254. The number of pulses in the high frequency signal which occurs before the unijunction transistor is rendered conductive to discharge capacitor 254 is determined in accordance with the interbase current as controlled by the reactance value of resistor 256.

Flip-flop circuit 261 is of conventional design and includes a pair of transistors 262 and 263. Resistor 270 is connected between the collector of transistor 263 and the base of transistor 262 and resistor 271 is connected between the collector of transistor 262 and the base of transistor 263. Resistors 270 and 271 provide the cross connections between the transistors which maintain one of the transistors nonconductive when the other is conductive. Diodes 264 and 267 are steering diodes which route the applied pulses to the base of the appropriate transistor. Resistor 265 maintains diode 264 back biased when transistor 262 is nonconductive, and resistor 268 maintains diode 267 back biased when transistor 263 is nonconductive. Thus, the flip-flop circuit responds only to a negative change of potential which occurs when capacitor 254 is discharged. This negative change in potential is applied through either diode 264 or 267 to the base of the conductive transistor, thereby rendering that transistor nonconductive. Accordingly, the flip-flop circuit changes state each time capacitor 254 is discharged.

As illustrated by waveforms 258 and 259, the frequency divider circuit is adjusted to provide a negative change in potential once for every eight pulses of the high frequency signal, thus effecting a frequency division by a factor of eight. Flip-flop circuit 261 further divides the frequency in half, and therefore the low frequency signal which appears on the collector of transistor 263 is reduced by a factor of sixteen when compared to a frequency of oscillator 211.

The low frequency signal is applied to the base of a PNP type transistor 281 in the phase shifter and mixer circuit 213 via a resistor 280. The emitter of transistor 281 is connected to a positive source of potential via a resistor 282, and the collector is connected to a negative source of potential via a resistor 283. Transistor 281 amplifies the low frequency signal which appears across resistor 283. Resistors 282 and 283 are of selected values so that the potential at the collector of transistor 281 is symmetrical with respect to a zero reference level. The collector of transistor 281 is connected to a variable tap of a resistor 284 which is connected across winding 285. The center-tape of winding 285 is connected to the center-tap of winding 286. One end of winding 286 is connected to the cathode of a diode 287, the anode of this diode being connected to ground. The other end of winding 286 is connected to the anode of a diode 289, the cathode of this diode also being connected to ground.

If the potential at the collector of transistor 281 is positive, the potential at the center-tap of winding 286 is also positive and therefore diode 289 is conductive, whereas diode 287 is back biased. Under these circumstances, the high frequency signal from the lower half of winding 286 passes through winding 285, resistor 284 and develops a high frequency signal across resistor 283. On the other hand, if the potential at the collector of transistor 281 is negative, the center-tap of winding 286 is also negative and therefore diode 287 is conductive. Under these circumstances, the signal developed across resistor 283 is derived from the upper half of winding 286. Thus, it can be seen that the high frequency signal which is developed across resistor 283 is phase shifted 180 degrees during each alternate half-cycle of the low frequency signal. Winding 285 and resistor 284 merely provide a convenient way of balancing the circuit and in many cases could be eliminated by connecting the collector of transistor 281 directly to the center-tap of winding 286.

One function of level control circuit 214 is to control the amplitude of the composite test signal applied to the base of the transistor under test. This is achieved by means of a lead sulphide light responsive cell 297. Cell 297 and a lamp bulb 298 are in an enclosure 296 which excludes ambient light. If there is no light within the enclosure, the resistance of cell 297 is extremely high, but as the quantity of light is increased by energizing lamp 298, the resistance of cell 297 decreases. Cell 297 is connected in series with resistors 295 and 290, between the cathode of transistor 281 and ground, to thereby provide a voltage divider. The amplitude of the composite signal appearing at the junction between resistor 295 and cell 297 decreases as the resistance of cell 297 decreases, which occurs as the quantity of light within enclosure 296 increases.

Another function of the level control circuit is to establish the reference potential of the composite test signal so that it can selectively be applied to test either PNP type transistors or PNP transistors. This is achieved by means of a double throw, single pole switch 292 which, in one position, connects the junction between resistors 290 and 295 to the positive source of potential via a resistor 293, or, in the other position, connects the junction to the negative source of potential via a resistor 294. The composite signal developed across resistor 283 (designated the "mixer output" in FIG. 8) is symmetrical with respect to a zero reference level.

If switch 292 is in the position shown in FIG. 10A, a positive DC potential is added to derive the signal designated "level control output" in FIG. 8, which is positive during time interval $t_1$ and slightly negative during time interval $t_2$. Thus, when this composite signal is applied to an NPN type transistor, the high frequency signal is applied at a bias level which renders the transistor conductive during time interval $t_1$ and at a bias level which maintains the transistor nonconductive during a time interval $t_2$. If, on the other hand, switch 292 is in the opposite position from that shown in FIG. 10A, a negative potential is added to the composite signal so that the output signal from level control circuit 214 is negative during time interval $t_2$, and only slightly positive during time interval $t_1$. This test signal is used when PNP type transistors are tested, since this signal is capable of maintaining a PNP type transistor nonconductive during time interval $t_1$ and conductive during time interval $t_2$.

The composite test signal provided by level control circuit 214 passes through base drive amplifier 215 and is applied to the base of transistor 202 (FIG. 10B) via resistor 206. The base drive amplifier is of conventional design and is connected between the positive and negative sources of potential so that the amplifier will be capable of amplifying signals of either polarity. Transistors 301 and 302 provide two stages of amplification. The base of transistor 301 is connected to the junction between cell 297 and resistor 295, and the collector of transistor 301 is connected to the base of transistor 302. The collector of transistor 302 is connected to the base of transistor 202 via resistor 206. Thus, the composite test signal appearing across cell 297 is amplified by the base drive amplifier and then applied to the base of the transistor under test. Transistor 303 provides current feedback so that the test signal will be applied to the transistor under test with an appropriate impedance match. As a result of the current feedback, no significant impedance is seen when looking back from the base of transistor 202.

AC amplifier 222, phase detector 224, DC amplifier 225 and meter 227 measure the true base current $i_B$ of the transistor under test. The potential developed across resistor 206, which is proportional to the AC current $I_B$, is coupled to the input of the AC amplifier by means of a transformer 311. One end of resistor 206 is connected to the center-tap of a primary winding 312 of transformer 311, and the other end of resistor 206 is connected selectively to one end or the other of winding 312 by means of a single pole, double throw switch 310. As previously mentioned, an NPN type transistor is rendered conductive during time interval $t_1$ of the composite test signal, and a PNP type transistor is rendered conductive during time interval $t_2$ of the composite test signal. Switch 310 applies the corresponding potential developed across resistor 206 to one-half of winding 312 if a PNP type transistor is being tested, and to the other half of winding 312 if an NPN type transistor is being tested. This is done so that the indication of $i_B$, which appears across meter 227, will be of the same polarity regardless of the type of transistor being tested.

AC amplifier 222 is of conventional design and includes transistors 314 and 315 which provide two stages of amplification. Secondary winding 313 of transformer 311 is connected between the base of transistor 314 and ground. The collector of transistor 314 is coupled in the base of transistor 315. The emitter of transistor 315 is connected to the positive source of potential via diode 316 which provides the necessary bias, and the collector of this transistor is connected to the primary winding 318 of a transformer 317. The output signal from the AC amplifier is developed across winding 318, and a portion of this signal is tapped off and developed across resistor 321 connected between the center-tap of winding 318 and one end thereof. The emitter of transistor 314 is connected to the variable tap of resistor 321 to thereby complete a negative feedback circuit which improves linearity and stability of the amplifier. The AC amplifier is designed with a frequency response which will amplify the high frequency portion of the composite signal and reject the low frequency portion. This is achieved primarily by the proper selection of capacitors 320, 322 and particularly the capacitor connected across winding 313. Thus, the signal appearing across the center-tapped secondary winding 324 of transformer 317 is a high frequency signal corresponding to the AC current flow $I_B$.

Phase detector 224 is similar to phase detectors 24 (FIGS. 3 and 6B), and therefore a full description of the phase detector circuit is not repeated. Phase detector 224 includes a pair of PNP type transistors 325 and 326. The emitters of these transistors are connected to opposite ends of winding 324, and the bases are connected to opposite ends of winding 242 of oscillator 211 via resistors 327 and 328 respectively. The collectors of transistors 325 and 326 are each connected to ground. If the synchronizing signal derived from the high frequency oscillator is in phase with the signal appearing across winding 324, the signal across winding 324 is rectified and a DC potential of one polarity appears between the center-tap of winding 324 and ground. If the synchronizing signal and the signal across winding 324 are 180 degrees out of phase, the signal across winding 324 is rectified and a DC potential of the opposite polarity appears at the center-tap of winding 324. Switch 310 is placed in a position such that the positive potential at the center-tap winding 324 always occurs when the transistor under test is conductive and so that the negative potential at the center-tap of winding 324 occurs when the transistor under test is nonconductive. Therefore, the positive portion of the bipolar signal has an amplitude proportional to the AC current flow $I_B$ through the base of transistor 202 and impedance elements 203–205, whereas the negative portion of the signal has an amplitude proportional to the AC current flow $I_B$ through the impedance elements 203–205 alone. Accordingly, the positive portion of the signal has an amplitude equal to or greater than the negative portion and the difference in these amplitudes is the true base currents $i_B$ of the transistor under test.

A resistor 329 is connected in series with a relatively large capacitor 338 between the center-tap of winding 324 and ground. The potential appearing across capacitor 338 is proportional to the average value of the bipolar signal appearing at the center-tap of winding 324, or in other words, of the potential across capacitor 338 is proportional to the true base current $i_B$.

AC amplifier 225 is of conventional design and includes transistors 330 and 331 which provide two stages of amplification. The base of transistor 330 is connected to the junction between capacitor 338 and resistor 329, and the collector of transistor 330 is coupled to the base of transistor 331. The output signal from the DC amplifier appears across the collector resistor of transistor 331. A portion of this output signal is fed back to transistor 330 via transistor 333 to thereby provide negative feedback to improve linearity and stability of the amplifier.

A DC meter 227 is connected between the collector of transistor 331 and ground. The indication appearing on this meter is the true AC base current $i_B$ flowing through the base-emitter circuit of transistor 202.

The function of the voltage control circuit 230 is to maintain a predetermined voltage, such as 5 volts, at the collector of the transistor under test. The circuit comprising transistor 340 and resistors 207, 241, 342 and 343 is employed to maintain a fixed collector potential for NPN type transistors under test. The circuit comprising transistor 348 and resistors 349–352 is employed to maintain a fixed collector potential for PNP type transistors under test. Transistor 340 is an NPN type transistor having its base connected to the junction between resistors 342 and 343. Resistors 342 and 343 are connected in series between the positive source of potential and ground to thereby provide a voltage divider which maintains a fixed potential at the base of transistor 340. The collector of transistor 340 is connected to the positive source potential via resistor 207, and the emitter thereof is connected to ground via resistor 341. The emitter of transistor 340 is also connectable to the collector of transistor 202 through a switch 339.

Transistor 340 maintains a potential at its emitter, and thus at the collector of transistor 202, which is positive and essentially the same as the potential at the base of transistor 340. The current supplied to circuit 201 flows from the positive source of potential, through resistor 207, the collector-emitter circuit of transistor 340 and switch 339. Thus, the AC potential developed across resistor 207 is proportional to the AC current $I_C$ which flows through the collector-emitter circuit of transistor 202 and through impedance elements 203–205 even though the potential at the collector of transistor 202 is fixed.

If a PNP type transistor is being tested instead of NPN type transistor 202, the circuit including transistor 348 is employed. The base of transistor 348 is connected to the junction between resistors 351 and 352 which form a voltage divider between the negative source of potential and ground. The collector of transistor 348 is connected to the negative source of potential via resistor 349 and the emitter is connected to ground via resistor 350. The emitter of transistor 348 is connectable to the collector of the transistor under test by means of switch 339. In this case, transistor 348 maintains a fixed negative potential at its emitter and the AC current $I_C$ develops a corresponding potential across resistor 349 instead of resistor 207.

The collector of transistor 340 is connected to one end of a primary winding 346 via a capacitor 344, and the collector of transistor 348 is connected to the other end of winding 346 via a capacitor 354. Resistors 345 and 355 connect between the ends of winding 346 and ground. Thus, the AC potential developed across either resistor 207 or resistor 349 appears across primary winding 346 and therefore passes through transformer 347 to the center-tapped secondary winding 356.

Phase detector circuit 331 is essentially the same as phase detector 224 and therefore need not be described in detail. This phase detector circuit includes a pair of PNP type transistors 357 and 358. The emitters of these transistors are connected to opposite ends of winding 356 and the bases thereof are connected to opposite ends of winding 242 (high frequency oscillator 211) via resistors 359 and 360, respectively. The collectors of the transistors are connected to ground. If the signal across winding 356 is in phase with the synchronizing signal derived from the high frequency oscillator, the phase detector rectifies the signal and provides a DC potential of one polarity at the center-tap of winding 356. If these signals are 180 degrees out of phase, the phase detector still rectifies the signal but a DC potential of the opposite polarity appears at the center-tap of winding 356. It should be noted that if an NPN type transistor is being tested, the AC signal is supplied to the upper end (as viewed in FIG. 10B) of winding 46, whereas if a PNP type transistor is being tested, the AC signal is applied to the lower end of winding 346. Therefore, it can be seen that the voltage level control circuits accomplish the same function with respect to phase detector 231 as is accomplished by switch 310 with respect to phase detector 224. Winding 356 is oriented with respect to winding 346 so that the AC signal is rectified to provide a positive potential at the center-tap of winding 356 while the transistor under test is conductive, and a negative potential while the transistor under test is nonconductive. The average value of the bipolar signal appearing at the center-tap of winding 356 is proportional to the true AC collector current $i_C$ and always has a positive value.

The level control amplifier and reference circuit 232 is responsive to the average value of the bipolar signal provided by phase detector 231, and is operative to adjust the current flow through lamp bulb 298 so that the amplitude of the true AC collector current $i_C$ through the transistor under test will be of a selected predetermined value. This circuit includes an NPN type transistor 362 having its base connected to the center-tap of winding 356 via a resistor 361, its collector connected to the positive source of potential via a resistor 370, and its emitter connected to the negative source of potential via a resistor 369. The collector of transistor 362 is also connected to a PNP type transistor 363 having its collector connected to ground. The emitter of transistor 363 is connected to the positive source of potential via the parallel combination of resistor 364 and capacitor 365 connected in series with lamp bulb 298. A relatively large capacitor 361 is connected between the emitter of transistor 363 and the base of transistor 362. Capacitor 361 maintains the base potential of transistor 362 at the average value of the bipolar signal developed by winding 356, and also provides negative feedback for the amplifier circuit.

Lamp bulb 298 and lead sulfite cell 297 within an enclosure 296 (these components being shown in FIGS. 10B and 10B) provide the coupling between the level control amplifier and level control circuit 214, thereby completing a servoloop including level control circuit 214, voltage control circuit 230, phase detector 231, and level control amplifier 232. Thus, the servoloop is completed through a light beam within enclosure 296, which is desirable since it provides complete electrical isolation between the amplifier and the level control circuit.

The operation of the servoloop system can be explained by initially assuming that there is no current flow through lamp bulb 298. Under these circumstances, the resistance of cell 297 has an extremely high value, and therefore, there is no significant attenuation of the composite test signal in level circuit 214. The composite signal therefore has a maximum value, the corresponding current flow $I_C$ through resistor 207 has a maximum value, the true collector current $i_C$ has a maximum value, and the base of transistor 362 is driven to its maximum positive value. Accordingly, transistors 362 and 363 become highly conductive and current begins to flow through lamp bulb 298. As a result, the light produced by this current flow through lamp bulb 298 decreases the resistance of cell 297, thereby decreasing the amplitude of the composite test signal passing through level circuit 214. As the current flow through lamp bulb 298 tends to increase, the resistance of cell 297 decreases, thereby bringing about a decrease in the true collector current $i_C$ and in the amplitude of current flow through lamp bulb 298. Conversely, as current flow through lamp bulb 298 tends to decrease, the resistance of cell 297 increases, thereby tending to increase the current flow through lamp bulb 298. Thus, the servoloop will ultimately reach a point of equilibrium when a certain true collector current $i_C$ flows through test transistor 202.

This point of equilibrium can be adjusted in either direction by means of a variable resistor 366. Resistor 366 is connected in series with a resistor 367 to provide a voltage divider connected between the positive source of potential and ground. The base of an NPN type transistor 368 is connected to a junction between resistors 366 and 367. The collector of transistor 368 is connected to the positive source of potential, and the emitter is connected to the negative source of potential via resistor 369. Transistor 368 tends to establish a potential across resistor 369 which is proportional to the base potential provided by the voltage divider including resistors 366 and 367. Thus, adjustment of resistor 366 effectively varies the emitter potential of transistor 362. It is apparent that the potential at the emitter of transistor 362 controls the gain of this transistor and therefore determines the equilibrium point of the servosystem and the amplitude of the true collector current through the transistor under test. The apparatus is initially calibrated by connecting an oscilloscope to the collector of transistor 342. Resistor 366 is then adjusted until the amplitude of the true collector current $i_C$ is of a selected predetermined value.

It should be noted that the automatic level control circuit always adjusts the amplitude of the composite test signal so that a predetermined true collector current flows through the transistor under test. Meter 227 indicates the amplitude of the true base current under these circumstances. Therefore, the meter scale plate can be appropriately calibrated to directly provide an indication of the gain of the transistor under test.

It is preferable that the system shown in FIGS. 7 and 10 be adapted to measure large signal AC current gain rather than the small signal gain. In measuring the small signal gain, as previously described with respect to the systems of FIGS. 1 and 2, the applied AC signal is relatively small so that the active element reproduces the AC signal at its output. In measuring large signal AC gain, a relatively large AC signal is applied at a bias level such that the transistor is conductive for one half-cycle of the AC signal and nonconductive for the alternate half-cycle. Referring to the composite test signal designated "level control output" in FIG. 8, the transistor under test would be rendered conductive only during the positive portions of the high frequency AC signal during time interval $t_1$ and would not be rendered conductive during the negative portions. The transistor under test would be maintained nonconductive throughout time interval $t_2$. This arrangement is preferable in the system illustrated in FIG. 7 since it is easier to properly control the amplitude of the composite test signal by means of a single feedback loop. The system could, however, be adapted to measure small signal current gain. The systems described in FIGS. 1 and 2 could easily be adapted to measure large signal current gain by merely increasing the amplitude of the applied AC signal and adjusting the bias levels accordingly. It should be noted that the small signal gain of a transistor is different from the large signal gain, but both of these measurements is meaningful in determining whether or not a transistor under test is operating properly.

Referring to FIG. 9, the signal developed across resistor 206 is designated $I_B$ and includes an AC signal during time interval $t_1$ which is larger than the AC signal during time interval $t_2$. The increase in the signal amplitude during time interval $t_1$ is because of current flow through the transistor base as the transistor is periodically rendered conductive. Phase detector 224 provides the bipolar signal designated ($I_B$) wherein the positive portion of the signal has an amplitude proportional to the amplitude of the AC current flow during time interval $t_1$ and the negative portion has an amplitude proportional to the amplitude of AC current flow during time interval $t_2$. Indicating circuit 227 responds to the average value of the bipolar signal, this average value being the true transistor base current $i_B$.

The signal developed across resistor 207 is shown in FIG. 9 and is designated $I_C$. Note that the transistor is nonconductive on the negative portions of the applied AC test signal during both time intervals $t_1$ and $t_2$. During time interval $t_1$, the transistor is periodically rendered conductive, accounting for the large positive pulses, whereas during time interval $t_2$ the transistor never becomes conductive and therefore the positive pulses are much smaller. Phase detector 231 provides the corresponding bipolar signal ($I_C$) wherein the positive portion of the signal has an amplitude proportional to the amplitude of AC current flow during time interval $t_1$ and the negative portion has an amplitude corresponding to the amplitude of AC current flow during time interval $t_2$. The level control amplifier is responsive to the average value of this bipolar signal and automatically adjusts the amplitude of the composite test signal until $i_C$ (the true AC collector current) attains a predetermined value.

While several specific embodiments of the present invention have been described in detail, it should be apparent to persons skilled in the art that there are numerous other embodiments within the scope of this invention. Each of the systems shown can be adopted to test NPN type transistors, PNP type transistors or other types of active elements. The invention is more particularly defined in the appended claims.

What is claimed is:

1. In apparatus for measuring the true AC current flow through an active element connected in a circuit with unknown passive impedances, the combination of
    a signal generator for providing
        a first AC signal, and
        a second AC signal which is periodically phase switched so that it is in-phase with said first signal during a first time interval and 180 degrees out-of-phase during a second time interval;
    circuit means for rendering the active element operative at a different bias level during said first time interval as compared to said second time interval;
    a phase detector circuit;
    circuit means for applying one of said AC signals to said phase detector circuit as a synchronizing signal and for applying the other one of said AC signals to the active element as a test signal;
    circuit means responsive to the AC current flow through the active element and unknown impedances as a result of said test signal, and operative to provide a signal to said phase detector corresponding to said AC current flow;
    said phase detector being operative to provide an output signal of one polarity if the signals applied thereto are essentially in-phase, and an output signal of the opposite polarity if the signals applied thereto are essentially 180 degrees out-of-phase, to thereby derive a bipolar output signal; and
    circuit means responsive to the average value of said bipolar signal.

2. Apparatus in accordance with claim 1 wherein
    said circuit means responsive to AC current flow is selectively connectable at the input and the output of the active element.

3. Apparatus in accordance with claim 1 wherein
    said first AC signal is applied to the active element as the test signal, and
    said second AC signal is applied to phase detector as the synchronizing signal.

4. Apparatus in accordance with claim 1 wherein
    said second AC signal is applied to the active element as the test signal, and
    said first AC signal is applied to said phase detector as the synchronizing signal.

5. In apparatus for measuring the true AC current flow through an active element connected in a circuit with unknown, in-circuit, passive impedances, the combination of
    a first signal generator for providing a low frequency square wave signal;
    a second signal generator for providing
        a first high frequency square wave signal, and
        a second high frequency square wave signal which is periodically phase switched so that it is in-phase with said low frequency square wave signal during one half-cycle of said low frequency signal and 180 degrees out-of-phase during alternate half-cycles of said low frequency signal;
    circuit means for superimposing one of said high frequency signals upon said low frequency square wave signal to derive a composite test signal;
    circuit means for applying said composite test signal to the input of the active element being tested;
    a phase detector responsive to current at said high frequency which flows through the active element and in-circuit impedances as a result of said test signal being applied;
    circuit means for applying the other one of said high frequency signals to said phase detector as a synchronizing signal, whereby said phase detector provides a bipolar output signal which is positive during one-half cycle of said low frequency signal and negative during the alternate half-cycle; and
    circuit means responsive to the average value of said bipolar signal.

6. Apparatus in accordance with claim 5 wherein
    said first high frequency signal is superimposed upon said low frequency signal; and
    said second high frequency signal is applied to said phase detector as a synchronizing signal.

7. Apparatus in accordance with claim 5 wherein
    said second high frequency signal is superimposed upon said low frequency signal; and
    said first high frequency signal is applied to said phase detector as a synchronizing signal.

8. In apparatus for measuring AC parameters of an active element capable of assuming a conductive and a non-conductive state, said element being connected in a circuit with unknown impedances, the combination of
    a signal generator for providing
        a first AC signal, and
        a second AC signal which is in-phase with said first AC signal during a first time interval and which is 180 degrees out-of-phase with respect to said first signal during a second time interval;
    first circuit means connectable to the active element to render the same conductive during one of said first and second time intervals and nonconductive during the other;
    variable attenuator circuit means for applying one of said AC signals to the input of the active element as a test signal;
    a first phase detector responsive to the AC input current resulting when said test signal is applied to the active element;
    a second phase detector responsive to the AC output current of the active element when said test signal is applied;
    second circuit means for applying the other one of said AC signals to said phase detectors whereby
        said first phase detector provides an indication of the true input current through the active element unaffected by the unknown impedances connected to the active element, and
        said second phase detector provides an indication of the true output current through the active element unaffected by the unknown impedances connected to the active element.

9. Apparatus in accordance with claim 8 adapted to automatically provide an indication of the AC current gain of the active element, further comprising
    a level control circuit responsive to the indication provided by one of said phase detector circuits, and operative, via said variable attenuator circuit means, to automatically adjust the amplitude of said test signal so that the indication to which said level control circuit is responsive is maintained at a predetermined level; and
    indicating circuit means responsive to the indication provided by said other phase detector to thereby derive an indication which is a function of the gain of the active element.

10. Apparatus in accordance with claim 9 wherein said level control circuit means is responsive to the indication provided by said second phase detector, and
said indicating circuit means is responsive to the indication provided by said first phase detector.

11. Apparatus in accordance with claim 8 wherein
said second AC signal is applied to the active element as said test signal, and
said first AC signal is applied to said phase detectors as said synchronizing signal.

12. Apparatus in accordance with claim 8 further comprising
a second signal generator for providing a low frequency signal having a frequency lower than the frequency of said first and second AC signals, and
wherein said first circuit means is operative to superimpose one of said first and second AC signals upon said low frequency signal to thereby derive a composite signal which is applied to the active element via said variable attenuator circuit.

References Cited

UNITED STATES PATENTS

| | | | |
|---|---|---|---|
| 3,051,900 | 8/1962 | Zechter | 324—158 |
| 3,153,759 | 10/1964 | Yagyu | 324—158 |
| 3,171,032 | 2/1965 | Holt | 250—205 X |
| 3,227,953 | 1/1966 | Cerveny | 324—158 |

RUDOLPH V. ROLINEC, *Primary Examiner.*

WALTER L. CARLSON, *Examiner.*

E. L. STOLARUN, *Assistant Examiner.*